(12) United States Patent
Tiramani et al.

(10) Patent No.: US 7,331,596 B2
(45) Date of Patent: Feb. 19, 2008

(54) COLLAPSIBLE MULTIFUNCTION APPARATUS

(75) Inventors: Paolo Tiramani, Norwalk, CT (US); Samvit Blass, Darien, CT (US); Adam Courter, Darien, CT (US)

(73) Assignee: 500 Group Inc., Stamford, CT (US)

( * ) Notice: Subject to any disclaimer, the term of this patent is extended or adjusted under 35 U.S.C. 154(b) by 0 days.

(21) Appl. No.: 11/517,552

(22) Filed: Sep. 8, 2006

(65) Prior Publication Data
US 2007/0063466 A1 Mar. 22, 2007

Related U.S. Application Data

(63) Continuation of application No. PCT/US2005/008322, filed on Mar. 14, 2005.

(60) Provisional application No. 60/552,935, filed on Mar. 12, 2004.

(51) Int. Cl.
*B62B 1/00* (2006.01)
(52) U.S. Cl. .............. 280/643; 280/47.27; 280/30; 280/47.19; 280/47.28; 280/47.33
(58) Field of Classification Search ............ 280/47.27, 280/47.28, 47.18, 47.19, 79.11, 643, 30, 47.33, 280/47.24, 47.25, 639, 38, 651, 652, 47.26, 280/654, 655, 47.2, 641
See application file for complete search history.

(56) References Cited

U.S. PATENT DOCUMENTS 4,236,462 A * 12/1980 Berthier et al. ............ 108/177
4,284,286 A * 8/1981 Lewallen .................... 280/30
5,957,472 A * 9/1999 Borgatti ...................... 280/30

(Continued)

FOREIGN PATENT DOCUMENTS

CA 2 391 204 12/2003

(Continued)

*Primary Examiner*—Christopher Bottorff
(74) *Attorney, Agent, or Firm*—David C. Jenkins; Eckert Seamans Cherin & Mellot, LLC

(57) ABSTRACT

These objects and others are attained by the present invention which provides a collapsible multifunction apparatus, comprising upper and lower sections with a front frame and rear prop legs, where the front frame is pivotably attached by hinges to both sides of the front portions of the upper and lower sections, and the rear prop legs are pivotably attached by hinges to both sides of the rear portions of the upper and lower sections. The hinge positions on both the left and right sides of the collapsible apparatus define (preferably symmetric) foldable left and right side quadrilaterals in which, in each left and right side fully opened quadrilateral, no two lengths are equilateral and no two lengths are parallel, and which collapse to form a substantially flat configuration for storage with nested front frame and rear prop legs. These desirable features, and others, are preferably enhanced by providing a further novel geometry in which, in the fully opened quadrilateral, the upper and lower hinge points of the front frame define a line A-B, the upper and lower hinge points of the rear prop leg are both lower than the upper and lower hinge points of the front frame, respectively, and the upper hinge point of the rear prop leg is closer to line A-B than the lower hinge point of the rear prop leg.

12 Claims, 7 Drawing Sheets

U.S. PATENT DOCUMENTS

| | | | |
|---|---|---|---|
| 5,967,544 A * | 10/1999 | Kanta | 280/652 |
| 6,196,560 B1 * | 3/2001 | Ohlsson | 280/30 |
| 6,328,319 B1 * | 12/2001 | Stahler, Sr. | 280/47.18 |
| 6,364,328 B1 * | 4/2002 | Stahler, Sr. | 280/47.18 |
| 6,474,663 B1 | 11/2002 | Becker | 280/47.18 |
| 6,530,583 B1 * | 3/2003 | Mueller | 280/47.18 |
| 6,578,856 B2 * | 6/2003 | Kahle | 280/30 |
| 6,834,868 B1 * | 12/2004 | Blackburn | 280/32.6 |
| 6,883,267 B1 * | 4/2005 | Pruitt | 43/54.1 |
| 6,886,836 B1 * | 5/2005 | Wise | 280/30 |
| 6,942,228 B2 * | 9/2005 | Bunce et al. | 280/30 |
| 6,942,229 B2 * | 9/2005 | Brazell et al. | 280/30 |
| 6,945,545 B2 * | 9/2005 | Celli | 280/47.18 |
| 7,021,637 B2 * | 4/2006 | Snider et al. | 280/37 |
| 2005/0051999 A1 * | 3/2005 | Bunce et al. | 280/652 |
| 2005/0093258 A1 * | 5/2005 | Brazell et al. | 280/30 |
| 2006/0038383 A1 * | 2/2006 | Wu | 280/652 |
| 2006/0076756 A1 * | 4/2006 | Wu | 280/652 |

FOREIGN PATENT DOCUMENTS

EP      0 272 797      6/1988

\* cited by examiner

COLLAPSIBLE MULTIFUNCTION APPARATUS

This application is a continuation of PCT application No. PCT/US2005/008322 filed Mar. 14, 2005, which in turn claims priority to provisional patent application No. 60/552,935 filed Mar. 12, 2004.

BACKGROUND

1. Field of the Invention

The present invention relates to a portable dolly. More particularly, the present invention relates to a portable dolly with storage capacity for transporting tools and that expands into a table, providing useful work surfaces and functional amenities.

2. Brief Description of the Background Art

Tradesmen in the field and consumer DIY (do it yourself) enthusiasts at home typically use many of the same tools. Many of these tools, especially those required for site work, are portable, e.g. not freestanding. Freestanding tools are typically the most efficient, however, among various professional users and DIY enthusiasts, as well as for projects in the field, etc., it is portable tools that are used most frequently. Accordingly, for most efficient use on common projects, these tools typically require:

a work surface;
tool storage and organization, like toolboxes;
a vice; and
a dolly (two wheel handcart), or
a truck (four wheel handcart).

A problem associated with this combination of features necessary for easy use of portable tools is the space they take up in the garage or home, on the jobsite, and/or in the transporting trailer, car or truck. Another deficiency is that such items are oftentimes ungainly (dollys and handtrucks) or unstable (such as tables or workbenches) or heavy (such as toolboxes and vices). Additionally, taken all together they can be very expensive. Moreover, common among multifunction contraptions is that oftentimes they perform no one particular function very well. Examples of prior art multifunction apparatus are found in EP 0 272 797A, US 6,474,663 B1 and CA 2 391 204 A1.

SUMMARY OF THE INVENTION

An object of this invention is to utilize a base architecture of a mechanically novel structure to provide a variety of product solutions from simple work table to a multifunction tool with the functionalities previously described.

A further object of the present invention is to provide a multifunction apparatus that fulfills disparate functional tasks without compromise.

Another object of the present invention is to provide a multifunction apparatus that can be inexpensively assembled for sale at a cost that reflects marketplace considerations in terms of providing affordable quality tools.

It is a still further object of the present invention to provide a multifunction apparatus that folds down in a gainly manner, particularly in which, regardless of the combination of provided functions, is space efficient, without sharp edges and also can be dependably stored in both vertical and horizontal positions.

These objects and others are attained by the present invention which provides a collapsible multifunction apparatus, comprising upper and lower sections with a front frame and rear prop legs, where the front frame is pivotably attached by hinges to both sides of the front portions of the upper and lower sections, and the rear prop legs are pivotably attached by hinges to both sides of the rear portions of the upper and lower sections. The hinge positions on both the left and right sides of the collapsible apparatus define (preferably symmetric) foldable left and right side quadrilaterals in which, in each left and right side fully opened quadrilateral, no two lengths are equilateral and no two lengths are parallel, and which collapse to form a substantially flat configuration for storage with nested front frame and rear prop legs. These desirable features, and others, are preferably enhanced by providing a further novel geometry in which, in the fully opened quadrilateral, the upper and lower hinge points of the front frame define a line A-B, the upper and lower hinge points of the rear prop leg are both lower than the upper and lower hinge points of the front frame, respectively, and the upper hinge point of the rear prop leg is closer to line A-B than the lower hinge point of the rear prop leg.

DETAILED DESCRIPTION OF THE INVENTION

Figure 1:
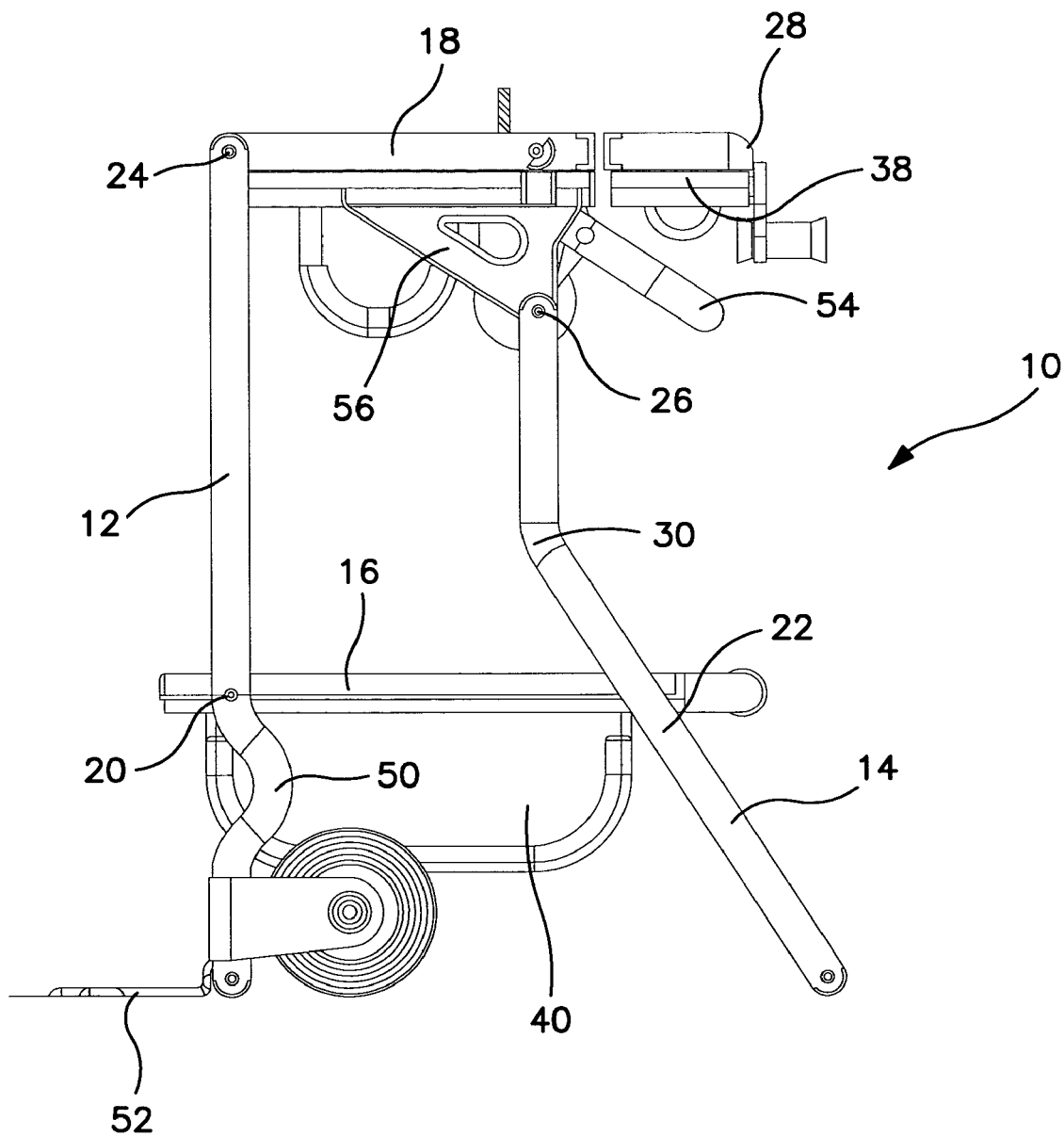
FIG. 1 is a side elevation of a two-wheeled dolly in a fully expanded position.

The invention relates to a base platform that collapses into a space-efficient substantially planar packaged state. The platform may be provided by hollow tubes, folded or extruded sheet, or solid rods of any suitable material (e.g., steel, aluminum, glass reinforced polymer, etc.). Although shown in the drawings as being round, no particular cross-section is preferred or limited.

From the collapsed, space efficient, packaged configuration the platform unfolds to provide a desired combination among the following functionalities:

a work surface
tool storage and material organization space
a vice
a dolly (two wheel handcart)
a truck (four wheel handcart)
power (electrical) outlet(s)

It is also a function of the invention to be an open-ended platform whereby additional functionalities can be added and combined to the basic architecture. In that regard, various attachments may be provided to create, if desired, a table-mounted router, a drill press, a circular (or band, or reciprocating) saw, a grinder, work lights, etc.

The core architecture of the invention is its mechanically novel geometry, from which all other functionalities of the product arise or may be provided. The frame is essentially a quadrilateral arrangement that, when viewed from a side elevation, can fold or scissor down (e.g., collapse) to be substantially flat. The quadrilateral arrangement may be deployed so as to unfold into an open, stable configuration. As described below, several geometric innovations are incorporated into this simple mechanical foundation, as desired, to produce additional functionality.

As best seen from the side elevation of FIG. 1, the multifunction apparatus 10 provides members hinged at four locations. Apparatus 10 is defined by front frame 12 and rear prop legs 14 connected to lower and upper sections 16, 18. The front frame 12 can be provided by separate pieces on left and right sides of upper and lower sections 16, 18 (see FIG. 4) or may be provided by integral ("U"-shaped or otherwise) framework, as desired. Similarly, rear prop legs 14 on left and right sides of upper and lower sections 16, 18 may be provided by separate pieces or an integral framework. Using an integral framework typically provides a more rigid construction.

Hinge points 20, 22 are provided at the front and rear of lower section 16 and hinge points 24, 26 are provided at the front and rear of upper section 18.

The multifunction apparatus can be completely collapsed so as to scissor down into a substantially flat configuration (see FIG. 2) or can be completely opened so as to provide the stable erected structure shown in FIG. 1. In FIG. 3, the present invention is beginning to unfold, where the operation of various hinge points 20, 22, 24, 26 can more clearly be seen.

Looking to FIG. 1 without being distracted by the various bends in tubing and other ancillaries, and simply visualizing connecting lines (not shown) between hinge points 20-22, 22-26, 26-24 and 20-24, is seen a modified quadrilateral that allows the apparatus to function to significant mechanical advantage. Proper arrangement of the hinge positions as described below defines the modified quadrilateral in which no two sides are parallel and in which no two opposite sides are equal in length.

FIG. 1 shows the four hinge points, e.g., upper-left 24, lower-left 20, upper-right 28 and lower-right 22, and illustrates how the geometry is revised from a pure trapezoid or parallelogram.

Figure 2:
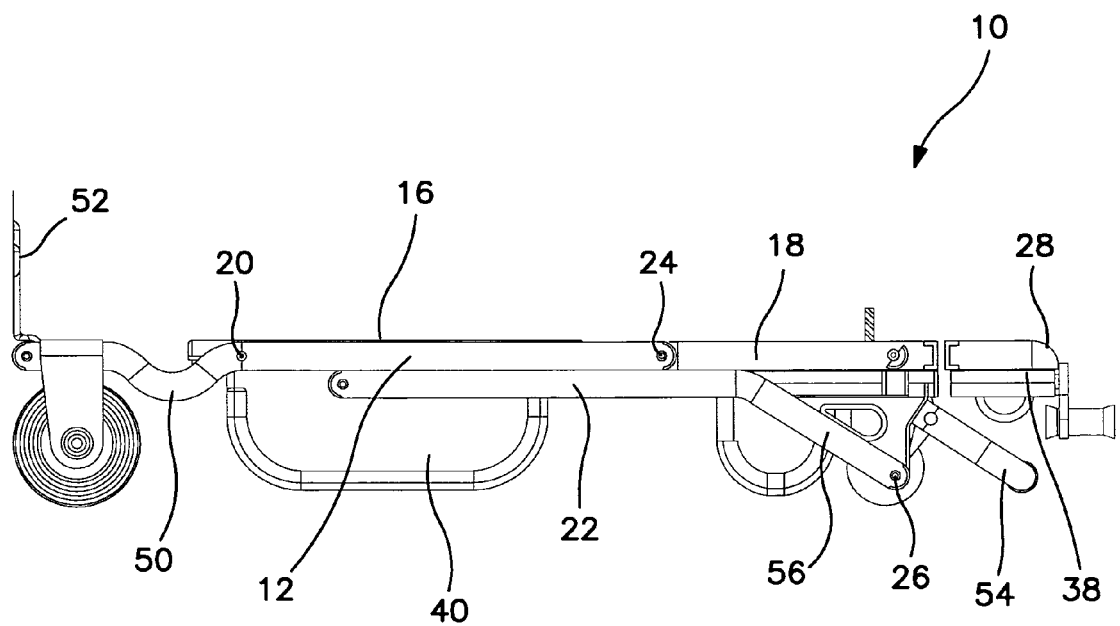
FIG. 2 is a side elevation view of the dolly of FIG. 1 in a completely collapsed position.
Figure 3:
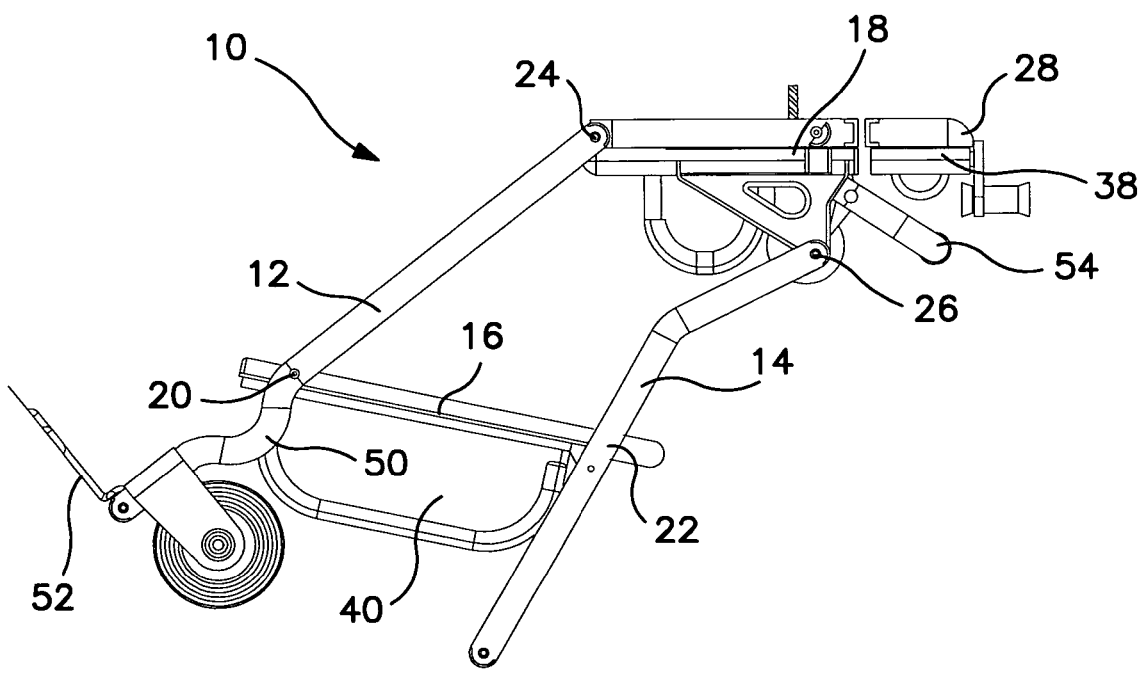
FIG. 3 is a side elevation view of the dolly of FIG. 1 in a partially-opened configuration.

In order for the invention to fold completely flat (as shown in FIG. 2) and using upper left and lower left hinge points 24, 20 as the baseline reference points, the bottom right hinge point 22 is sited downward from the corresponding position of bottom left hinge point 20. Preferably, bottom right hinge point 22 is sited at least one tube thickness lower than bottom left hinge point 20 to attain most compact storage. By these features, the following advantages are better attained: the front frame 12 and prop legs 14 in the collapsed flat position (FIG. 2) can completely-collapse and lay directly on top of one another, thereby best achieving practical packaging and storage.

In order for rear prop legs 14 to provide a greater footprint and enhanced stability, rear prop legs are desirably folded on hinges 26, 22 which define a line C-D (not illustrated) set at an angle to the line A-B (not illustrated) defined by the hinges 24, 20 of front frame 12. This angle is achieved by moving the upper-right hinge point 26 lower than the corresponding upper-left hinge point 24 as well as inwardly (e.g., to the left in FIG. 1) of the lower-right hinge point 22.

As such, in the expanded open position (see FIG. 1), the rear prop legs 22 are able to extend outwardly past the edge 28 of upper section 18, thereby imparting greater stability to the invention. This is desirable, e.g., when apparatus 10 is used as a worktable, such as when upper section 18 provides a work surface as illustrated. Whereas this would have been previously provided by leg extensions or other contraption, this preferred embodiment is able to achieve same with only pure geometry, thereby saving cost, folding very flat and providing an elegant and mechanically superior solution.

Through careful mathematical calculation, this base geometry was engineered to ensure the multifunction apparatus lays completely flat when collapsed and yet provides an optimum footprint for stability when completely opened. Although these principles have been employed in the preferred embodiment to maximum effect, they may nevertheless be used together or independently, e.g., to invert the geometry and/or provide either more or less stability as desired.

In one desirable embodiment, rear prop legs 14 descend substantially vertically from hinge 26 and are bent at "knee" 30 (see FIG. 1) or alternatively, are curved outwardly (not illustrated) substantially continuously. These embodiments create greater clearance above hinge point 22 so as to minimize interference from clothing, operator's legs and work pieces, etc., from bumping the prop legs 14. Additionally, these configurations of prop legs 14 provide a larger "footprint" and even further enhanced stability.

Figure 5:
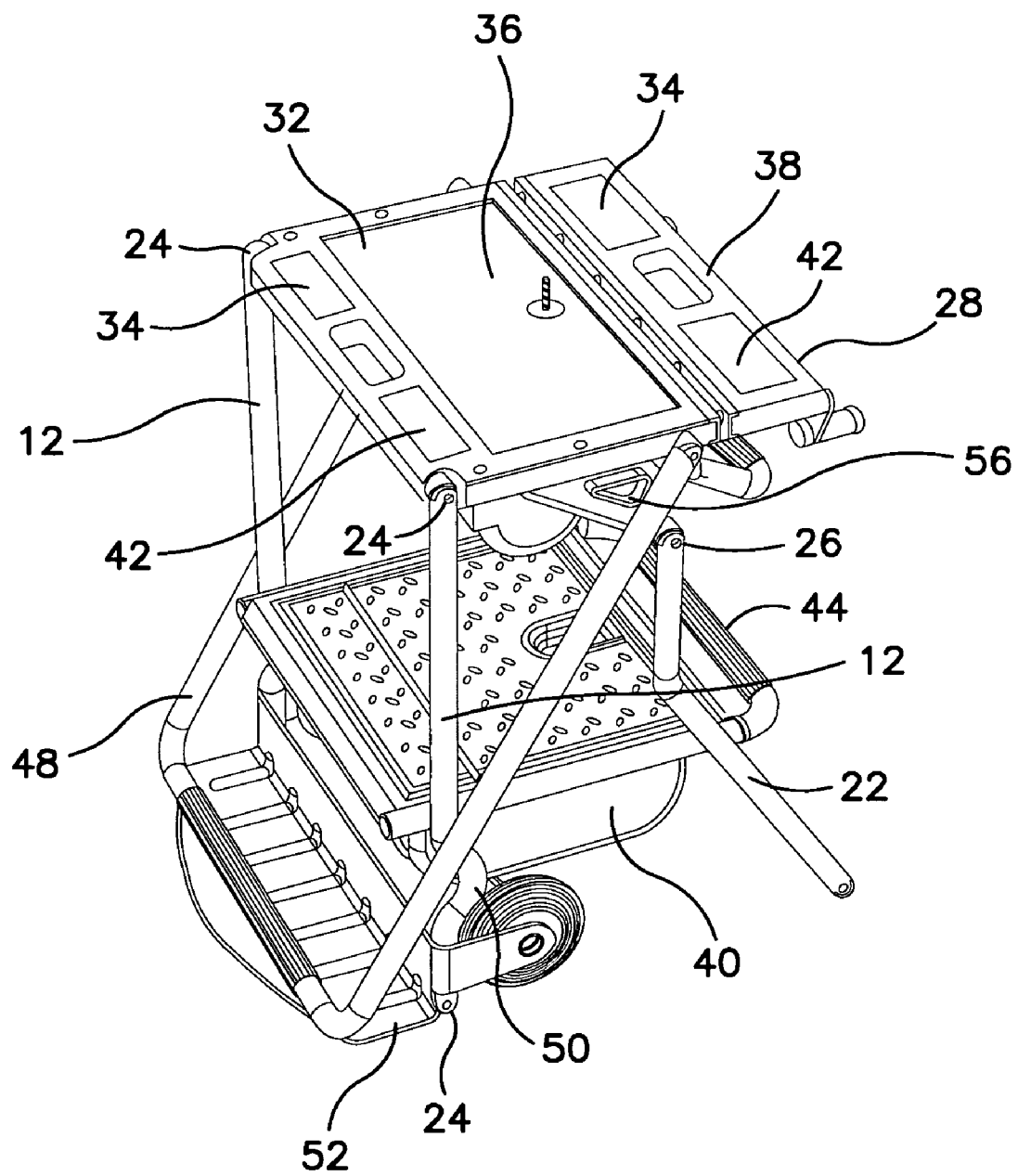
FIG. 5 is a perspective view of the dolly of FIG. 1 illustrating a work surface.

The upper and lower sections 18, 16 may be provided by a simple tubing structure, or more preferably, upper section 18 provides a desirable functional surface such as a multifunction top 36 (with optional organizer 34), as shown in FIG. 5. Additionally, upper section can provide a vice 38, also as shown in FIG. 5. Lower section 16 can similarly provide a multi-function surface or storage container 40, as shown in FIG. 5

Storage container 40 can have any desired functionality and may, in fact, be removable. It is especially desired that is accessible and functional from both the fully open fully collapsed positions of FIGS. 1 and 2. Of mechanical merit is the half-door opening shown in FIG. 4 can open in any configuration without the contents spilling out.

Additionally, the device 10 may include electrical outlet (s) 42 for readily available power. Electrical outlets 42 are preferably provided with ground fault interrupter circuitry for operator safety.

Of course, upper section 18 may provide whatever work surface is desirable; in addition to the illustrated multifunction top or organizer, it may provide a simple tube or lattice to serve as a basic work trestle upon which to put another work surface or a wooden top, clamp top, welding table, etc. Of novel value is the fact that additional components for these are not needed, and necessary architecture can bolt directly to the work surface.

As seen in FIG. 1, it is desirable that at least upper section 18 be horizontal when apparatus 10 is fully expanded, especially when section 10 provides a functional work surface. Similarly, it may be preferable that lower section 16 be horizontal, to provide temporary tool storage.

Figure 6:
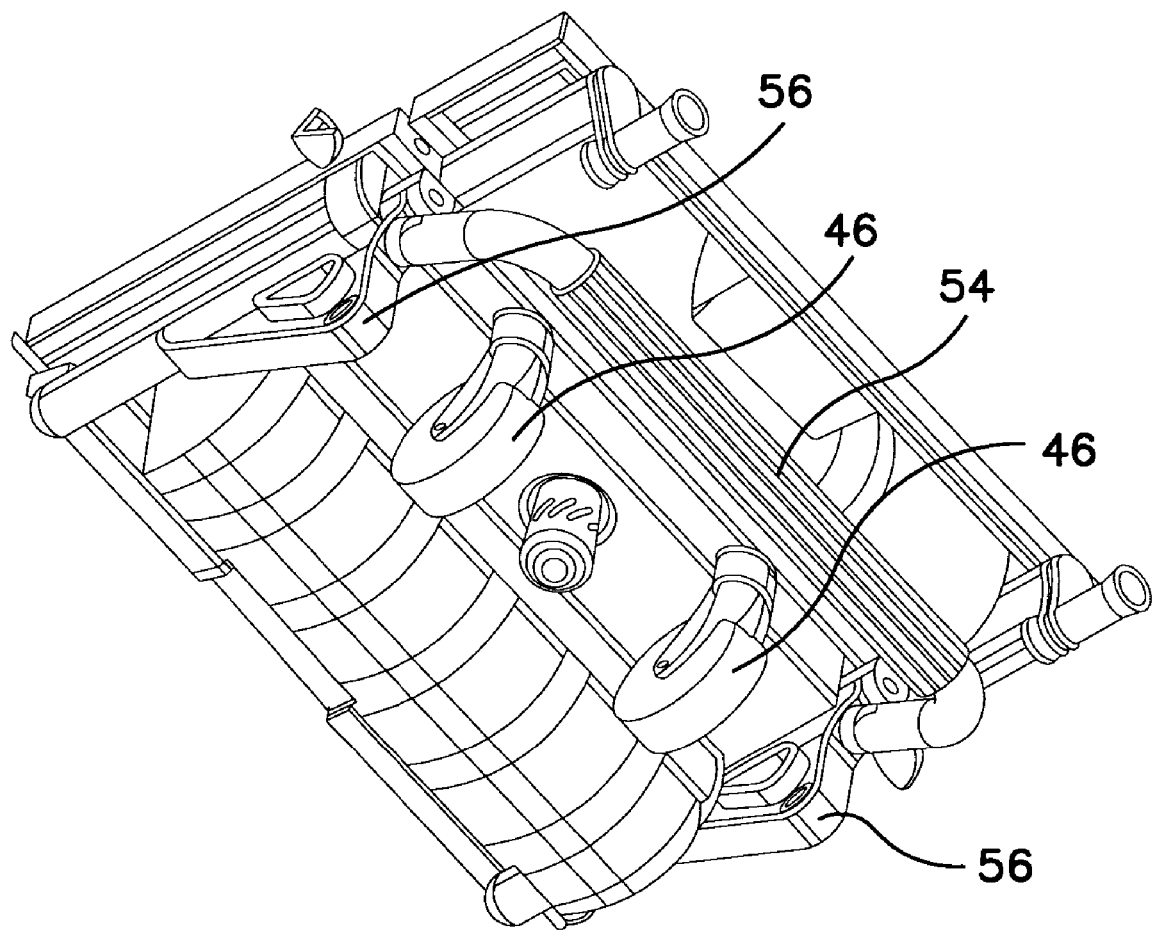
FIG. 6 illustrates a set of castor-mounted wheels for a truck configuration.

Seen in FIG. 6 is a 'U' shaped hoop, preferably provided with anti-skid material or surfacing. The hoop is typically part of lower section 16 and so attaches at pivot points 20, 22 and extends outside the framework to provide a foot bar 44 which performs several valuable functions. For instance, foot bar 44 permits an operator to place a foot (with body weight) to further brace upper section 18 when sawing or working. This steadies the table and affords the user with greater efficiency.

Figure 7:
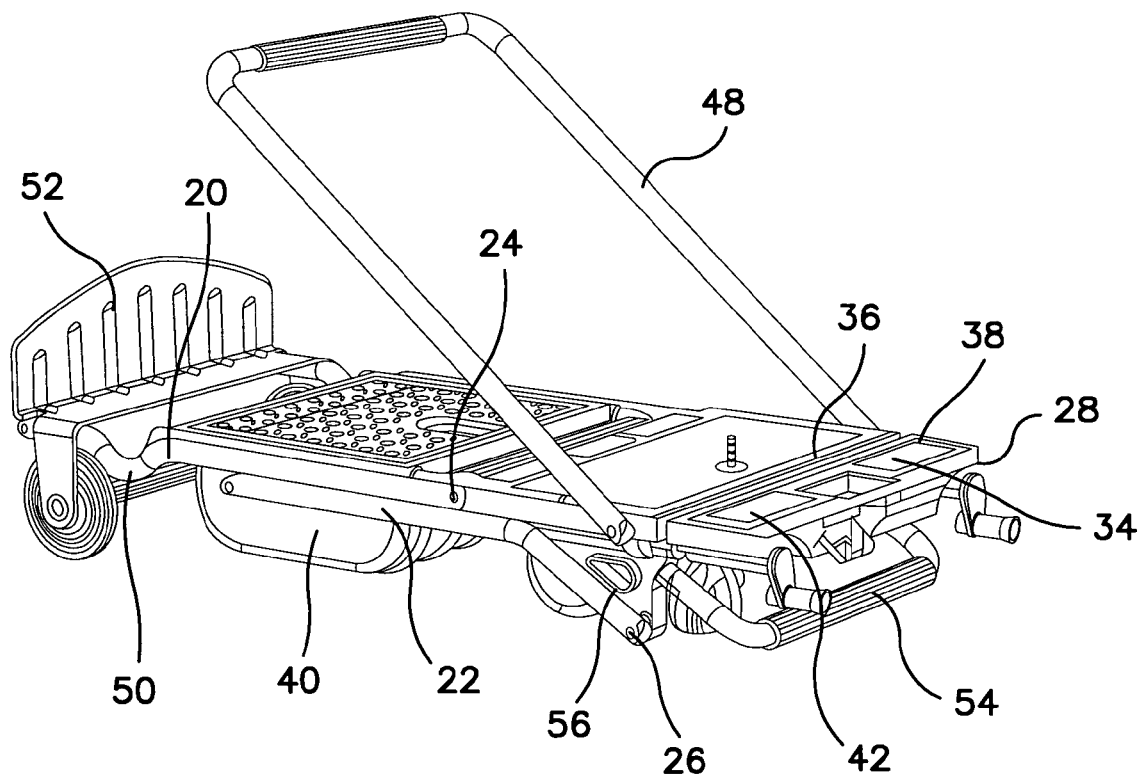
FIG. 7 illustrates a handle provided with the truck of FIG. 6.

Collapsible apparatus 10 may provide an extra set of wheels 46, preferably castor-mounted as shown in FIG. 6, so as to provide an alternative truck mode. If so, foldable pull handle 48 (see FIG. 7) may also be provided, together with recesses 50 located in front frame 12 to accommodate storage of pull handle 48 to fold completely flat when not in use or in dolly mode.

Additionally, pull handle 48 is engineered to lay on dolly scoop 52 in the open position (see FIG. 4) so that if apparatus 10 is picked up, or moved, the handle 48 does not slide on the ground and interfere with operation.

Figure 4:
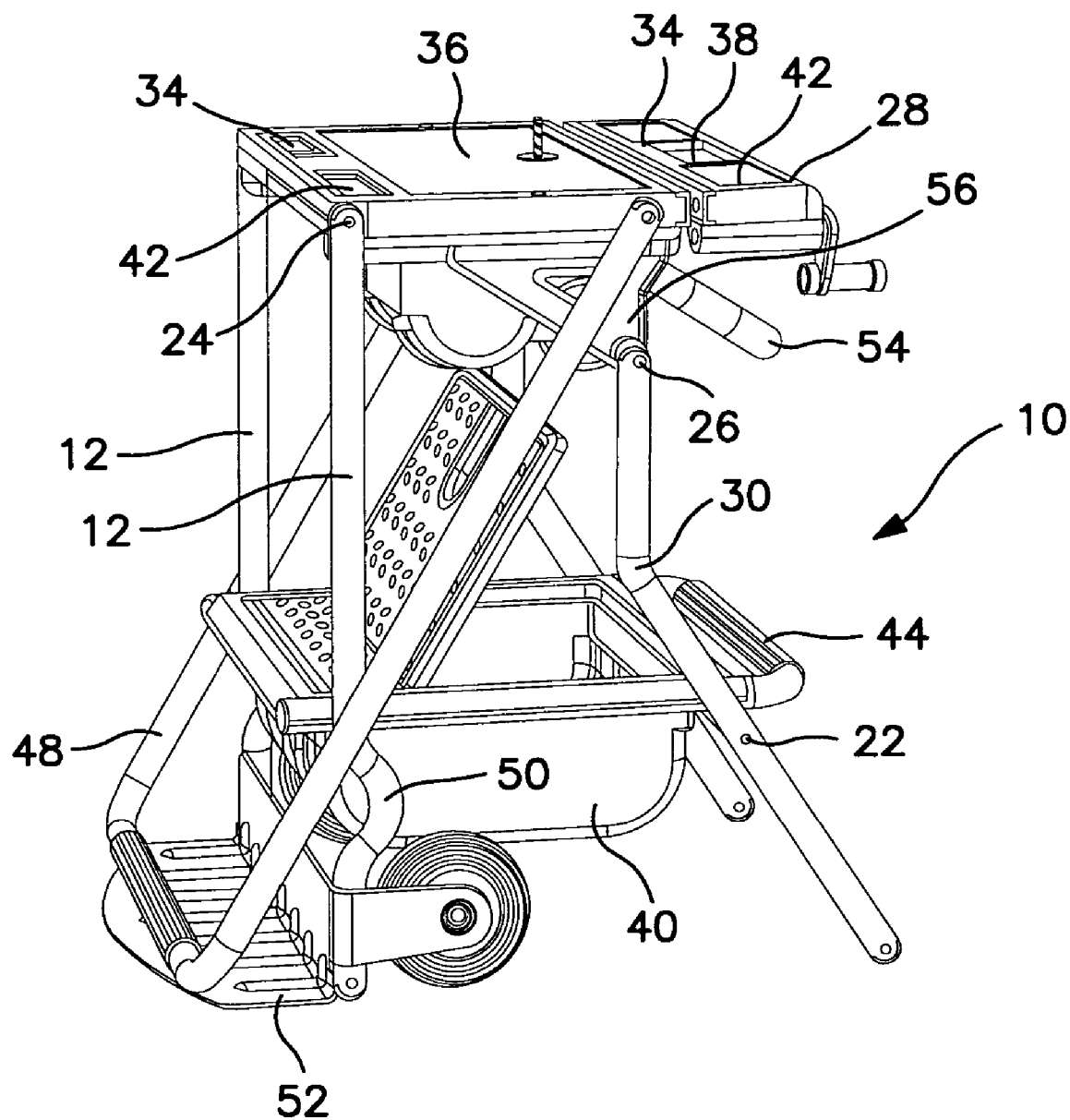
FIG. 4 is a perspective view of the dolly of FIG. 1 illustrating an open storage container.

The dolly scoop 52 can be seen in FIGS. 1-4 and 7 and serves various functions, including:
- adding lateral integrity to the structure
- acting as a simple and elegant wheel holder
- providing vertical support so the invention, when collapsed as a dolly, can be free-standing
- providing vertical stabilization so the invention, when collapsed as a truck, can be stood on-end
- provides a backstop to prevent packages from falling off in the truck configuration
- provides rear stability for a work table when in a fully expanded position (see FIG. 4)
- to prove a rest position for truck pull handle 48, also when in a fully expanded position as a worktable (see FIG. 4).

Additionally, seen in FIG. 4 is a front tubular bar 54 attached to upper section 18 to provide a grab handle for the dolly, (if this is omitted, a convenient handle can be readily provided in multifunction top 36) and a towel or tool-hanging bar.

As shown in FIG. 6, multi anchors 56 are provided to multifunction top 36. Multi anchors 56 share the stress loads on the invention with both the prop legs 14 described earlier and the upper section 18 itself, as well as serving as the housing for the screw box (which moves the vice 38 jaws open and closed) and also provides a receiver for the dolly hand grip/towel bar 54.

What is claimed is:

1. A collapsible multifunction apparatus, comprising: upper and lower sections, said sections each having front and rear portions, and left and right sides; a front frame; and rear prop legs, said front frame and said upper and lower sections being interconnected by hinges at both sides of the front portions of the upper and lower sections, said rear prop legs and said upper and lower sections being interconnected by hinges at both sides of the rear portions of the upper and lower section, wherein the hinge positions on both the left and right sides define symmetric foldable left and right side quadrilaterals in which, when each left and right side is fully opened, no two lengths are equilateral and no two lengths are parallel, the multifunction apparatus further comprising a pair of wheels and a dolly scoop distal to said upper section wherein (i) in said fully opened quadrilateral, the upper and lower hinge points of said front frame define a line A-B, the upper and lower hinge points of said rear prop leg are both lower than the upper and lower hinge points of said front frame, respectively, and the upper hinge point of the rear prop leg is closer to line A-B than the lower hinge point of the rear prop leg, wherein (ii) said front frame and said rear prop legs abut each other when said multifunction apparatus is fully collapsed, and wherein (iii) said upper and lower sections provide horizontal surfaces when said multifunction apparatus is fully opened.

2. The collapsible multifunction apparatus of claim 1, wherein the rear prop leg is provided with a discrete bend so the portion distal from said upper section extends further outwardly of the upper and lower flat sections when the handcart is fully opened.

3. The collapsible multifunction apparatus of claim 1, wherein the rear prop leg is arcuate so the portion distal from said upper section extends further outwardly of the upper and lower flat sections when the handcart is fully opened.

4. The collapsible multifunction apparatus of any one of claims 1, 2 or 3 which, when fully collapsed, provides a substantially planar shape.

5. The collapsible multifunction apparatus of claim 4, wherein the upper section provides a solid work surface.

6. The collapsible multifunction apparatus of claim 5, wherein the upper section further provides a vice.

7. The collapsible multifunction apparatus of claim 5, wherein the lower section provides a closeable storage recess.

8. The collapsible multifunction apparatus of claim 7, further comprising an electric power receptacle.

9. The collapsible multifunction apparatus of claim 8, wherein the electric power receptacle is ground fault protected.

10. The collapsible multifunction apparatus of claim 5, further comprising a second pair of wheels provided so as to configure a hand cart when said multifunction apparatus is completely collapsed.

11. The collapsible multifunction apparatus of claim 10, further comprising a pivoting pull handle, wherein said front frame is provided with recesses to receive said footrest when said multifunction apparatus is collapsed.

12. The collapsible multifunction apparatus of claim 5, wherein the lower section provides a protruding foot bar having an anti-skid texture.

* * * * *